United States Patent [19]

Harrold et al.

[11] Patent Number: 4,651,602

[45] Date of Patent: Mar. 24, 1987

[54] METHOD FOR SHEARING BILLETS

[75] Inventors: Donald T. Harrold, Pittsburgh; Jeffrey P. Dziki, Sewickley, both of Pa.

[73] Assignee: Sutton Engineering Company, Pittsburgh, Pa.

[21] Appl. No.: 721,167

[22] Filed: Apr. 8, 1985

[51] Int. Cl.[4] ...................... B23D 33/07; B23D 33/10; B26D 7/10
[52] U.S. Cl. .......................................... 83/15; 83/71; 83/170; 83/363; 83/364
[58] Field of Search ..................... 83/15, 170, 71, 362, 83/363, 364

[56] References Cited

U.S. PATENT DOCUMENTS

| | | | |
|---|---|---|---|
| 3,170,355 | 2/1965 | Neely, Jr. | 83/364 X |
| 3,422,711 | 1/1969 | Toney et al. | 83/170 X |
| 4,526,073 | 7/1985 | Elhaus | 83/15 |
| 4,559,854 | 12/1985 | Jurgens | 83/15 X |

*Primary Examiner*—James M. Meister
*Attorney, Agent, or Firm*—Thomas H. Murray; Clifford A. Poff

[57] ABSTRACT

A method and apparatus for shearing logs to form billets includes movable stop at the discharge side of a shear to measure the length of the log passed through the shear. A light beam impinges on a detector when the trailing end of a log passes beyond the light beam to produce a signal concurrently with a signal which is produced by displacement of the movable stop. The concurrent production of these two signals is used to produce a third signal corresponding to a measure of the length of the log. The latter signal is used for determining the sheared length of one or part of a two-piece billet that can be produced from the log-end portion. The log is severed by displacing a movable upper die of the shear beyond a stationary lower die. In one embodiment, a gripper engages and pulls the end of the log from the shear. In a second embodiment, an H-shaped frame extending outwardly at the discharge side of the shear carries a movable stop. In both embodiments, the gripper or movable stop is carried on a movable block that can be moved back and forth along guide rods that are supported by the shear.

9 Claims, 11 Drawing Figures

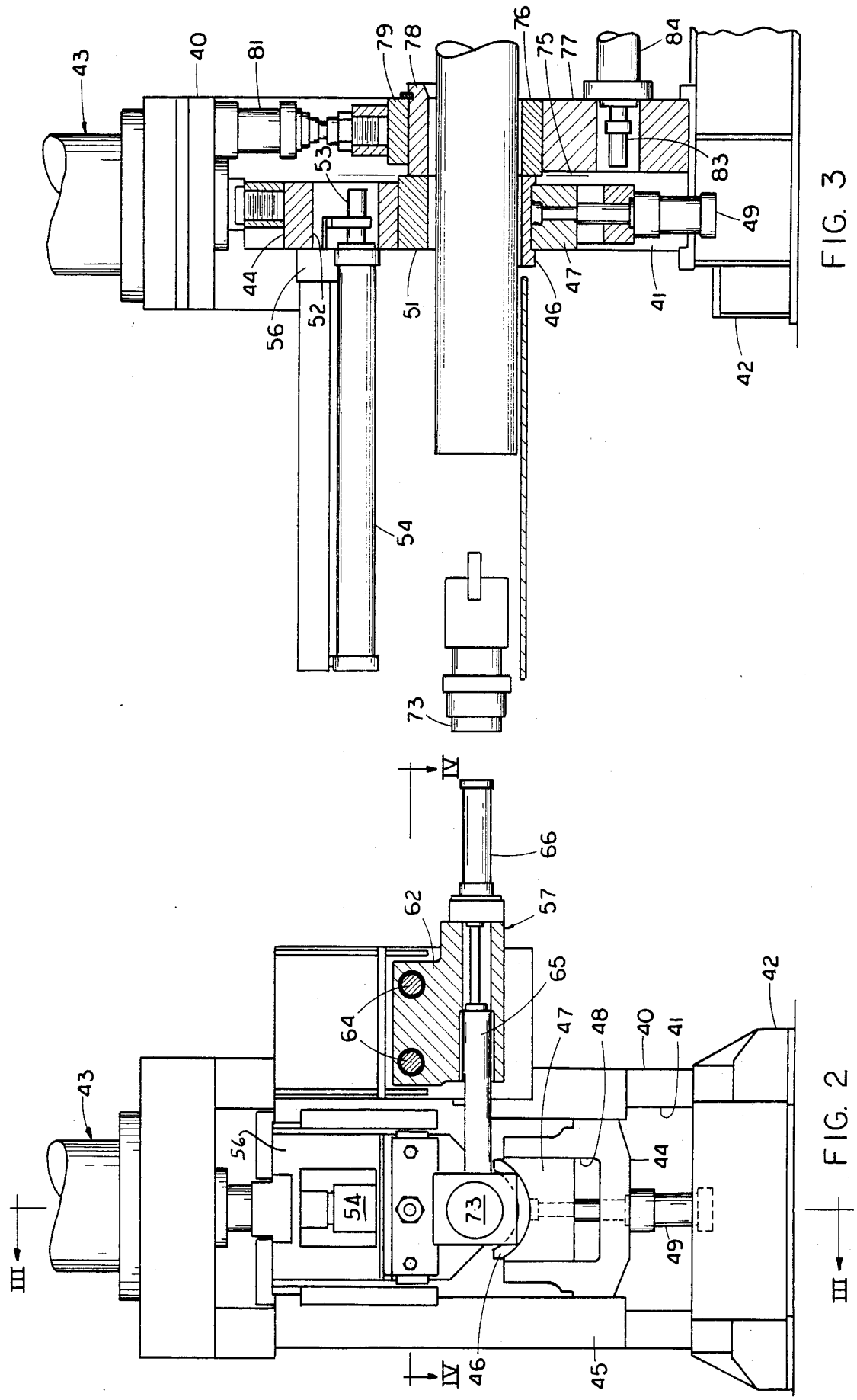

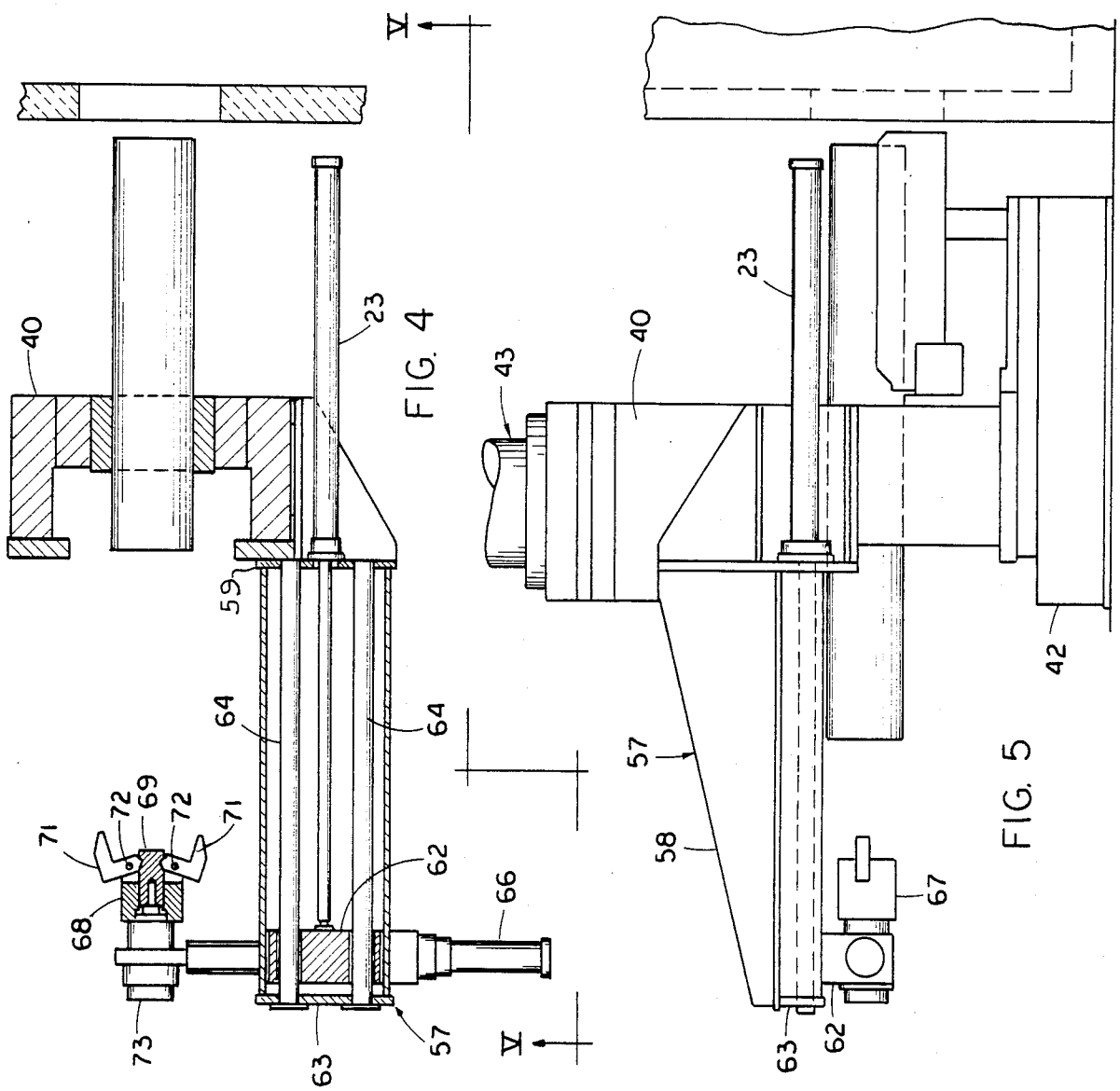

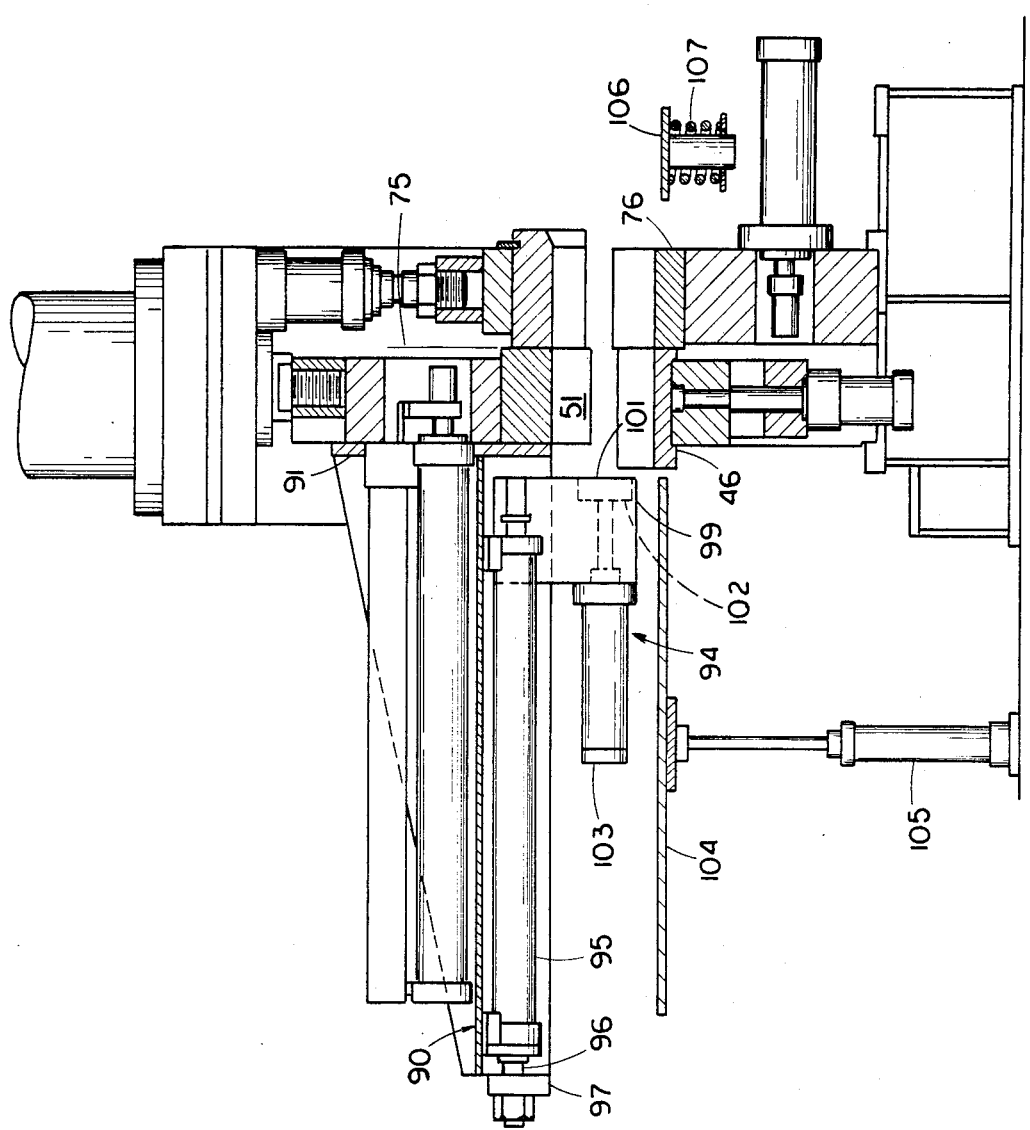
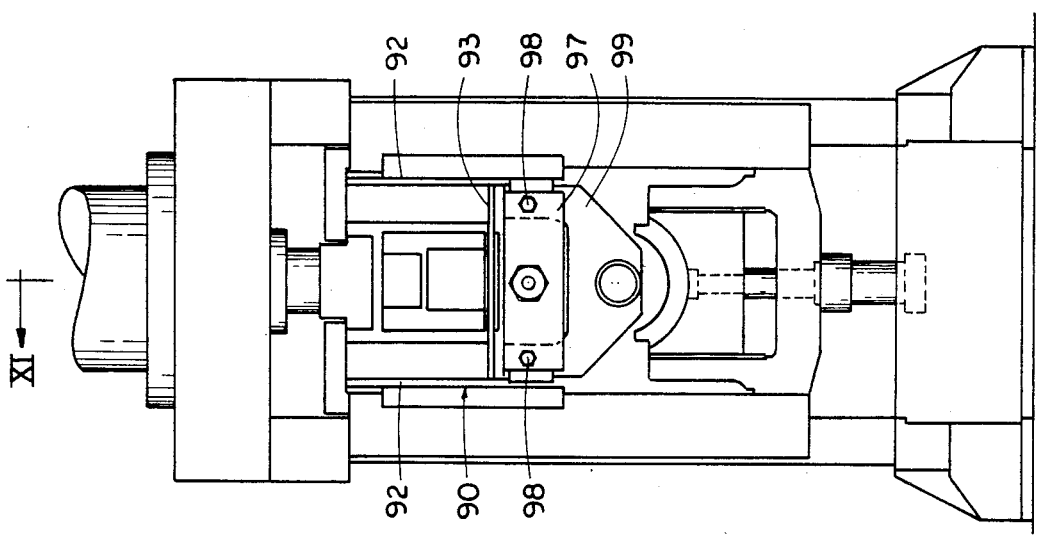
FIG. 11
FIG. 10

METHOD FOR SHEARING BILLETS

BACKGROUND OF THE INVENTION

This invention relates to a method and apparatus for subdividing a heated metal workpiece to form a number of billets each having a predetermined length which is selected to meet the requirements for operation of an extrusion press or other metalworking apparatus.

It is common practice to load a heated metal billet comprised of, for example, aluminum in a container of an extrusion press. At one end of the container there is a die through which material of the billet is forced by an extrusion stem that is advanced from the other end of the container by a ram. A dummy block may be situated between the billet and the stem. Billet material is extruded through the die until a small discard length of billet material remains in the billet container. By this type of extrusion operation, the stem or dummy block, if used, will not be brought into contact with the die; thereby avoiding possible damage to the die. The amount of billet discard material can be controlled by stopping the advancement of the press ram so that a preselected length of billet discard material remains in the billet container. However, extrusions having the same lengths cannot always be produced from billets having the same length. This is because the volume of billet material may change from time-to-time due to changes to the diameter of the billet. Also, wear of the extrusion die increases the required volume of billet material which is necessary to repeatedly produce extrusions having the same predetermined lengths. To compensate for wear of the die, billets having slightly increasing volumes of material must be supplied over an extended period of operation by the extrusion press. A conventional procedure for supplying billets to an extrusion press included supplying a succession of logs, i.e., workpieces, in an end-to-end relationship to a furnace wherein the log material is heated to a temperature for a subsequent extrusion process.

A heated log is pushed or driven out of the furnace through a log shear, until the log is engaged by a mechanical stop which has been adjustably positioned at a predetermined location to produce a desired billet length. Billets are cut from the log, and each billet length is subtracted from a premeasured log length so that an approximate remaining length of the log can be determined to accurately produce the final billet from the log. Elongation factors are used to estimate the heated log length based on the premeasured length to maximize the use of the entire log. However, hot and cold areas in the furnace affect the actual length which contributes to the difficulties encountered to an accurate remaining log length.

The present invention provides a method and apparatus for supplying billets having a predetermined length for use as workpieces in an extrusion press in which the lengths of billets can be accurately controlled by operation of a shear used to subdivide a log into the billets. The present invention also reduces waste of log material resulting from the shearing operation by maximizing the use of log end portions which may be too short to form a single billet but can be utilized to form one or more billets comprised of two log pieces.

In West German patent publication No. 32 15 798, there is disclosed a system and apparatus to control shearing of a heated metal log into billets through the use of a mechanical device arranged to detect the gap between the ends of two successively-arranged logs at the entry side of a shear. A mechanically-adjustable stop at the discharge side of the shear is connected by a push-pull cable to a carrier of an optical detector at the entry side of the shear. The stop can be moved between minimum and maximum billet lengths from the parting line between the shear knives whereby the push-pull cable moves the optical detector back and forth relative to the shear knife-parting line from a center position corresponding to one desired billet length. When the length of a log end portion extending between the shear and the detector is greater than a desired billet length, a short scrap end piece is cut. This procedure is wasteful of log material and necessitates the disposal of a very short log section which is likely to jam or otherwise cause malfunctioning of the billet-handling equipment at the discharge side of the shear.

SUMMARY OF THE INVENTION

It is an object of the present invention to provide a method and apparatus for severing a log to form billets having precise lengths and controlling the piece lengths when two-piece billets occur.

The method for utilizing a billet shear according to the present invention provides that the leading end of the log is positioned at a controlled distance from the shear line at the interface between two shear knives. A means for establishing the controlled distance is a movable stop which bears against the leading edge of the log. The stop can be moved beyond a minimum distance from the shear line to a distance of a desired billet length. Normally, the log is moved against the stop by the drive provided in the log heater, or by driven rolls located between the heater and shear. It is preferred, however, to grip the leading end of the log and pull it to the desired position from the shear line between the shear knives. When the detected length of the portion of the log extending from the shear line toward the log heater is less than a desired billet length, an end piece is cut from this part of the log and a length of log material is cut from a succeeding log to provide a two-piece billet or the log portion is cut in half and two-piece billets are subsequently formed for supply to the extrusion press. In the process, it is desirable to limit the length of either piece comprising the two-piece billet because a very short piece is difficult to handle.

More particularly, the present invention provides a method for shearing logs to form billets for an extrusion press in which the method includes the steps of passing a first log from a reheat furnace into a shear for shearing a succession of billets having desired lengths, measuring the trailing section of the log, and repositioning the leading end of the trailing section where necessary to control the lengths of each piece in a two-piece billet. It will occasionally be necessary to cut the trailing end into two or more pieces and store one or more pieces to which other short pieces are subsequently added to produce two or more two-piece billets of the desired length. A convenient method of measuring the trailing section of log is to create a gap between it and the following log, sensing the gap with a sensor such as a photocell or similar contacting or non-contacting sensor and simultaneously sensing the position of the leading end. A preferred method for creating the gap is to pull the log through the shear but, when desired, driven rolls can be provided between the log heater and shear to move the trailing log section faster than the following log. When driven rolls are used, a detector is required to perform a difficult measurement of the distance from the leading end of the trailing section to the sensor at the gap. Therefore, it is preferred to grip the leading end of the log to move the trailing log section through the shear. The means by which the log section is moved includes a position sensor to measure the distance from the leading log end to the gap sensor at the instant when the trailing log end passes. A gap is created by stopping the drive in the log heater at the instant the log is gripped. The position sensor for the moving means can also be used to position the front end of the log or log piece for establishing precise billet lengths throughout the shearing of billets from the log.

The present invention further provides a shear apparatus for severing billets from a log by a combination which includes first and second shear die means having alignable apertures approximately conforming to the cross-sectional shape of a log, a housing for supporting the shear die means, actuator means supported by the housing for displacing the first shear die means relative to the second shear die means to sever a log, a frame displaceable with the first shear die means by operation of the actuator, and measuring means including a movable stop and a gripper for producing an electrical signal corresponding to a measure of the length of a portion of a log pulled from the aperture of the first shear die means by the gripper.

In a further embodiment of the shear apparatus there is provided first and second shear die means having alignable apertures approximately conforming to the cross-sectional shape of a log, a housing for supporting the shear die means, actuator means supported by the housing for displacing the first shear die means relative to the second shear die means to sever a log, a frame displaceable with the first shear die means by operation of the actuator, and measuring means including a movable stop supported by a displaceable frame for producing an electrical signal corresponding to a measure of the length of a portion of a log passed through the aperture of the first shear die means.

These features and advantages of the present invention as well as others will be more fully understood when the following description is read in light of the accompanying drawings, in which:

FIG. 2 is a front elevational view, partly in section, of one embodiment of the billet shear according to the present invention;

FIG. 3 is a sectional view taken along line III—III of FIG. 2;

FIG. 4 is a sectional view taken along line IV—IV of FIG. 2;

FIG. 5 is a side elevational view taken along line V—V of FIG. 4;

FIG. 10 is a front elevational view of a second embodiment of a billet shear embodying the features of the present invention; and FIG. 11 is a sectional view taken along line XI—XI of FIG. 10.

Figure 1:
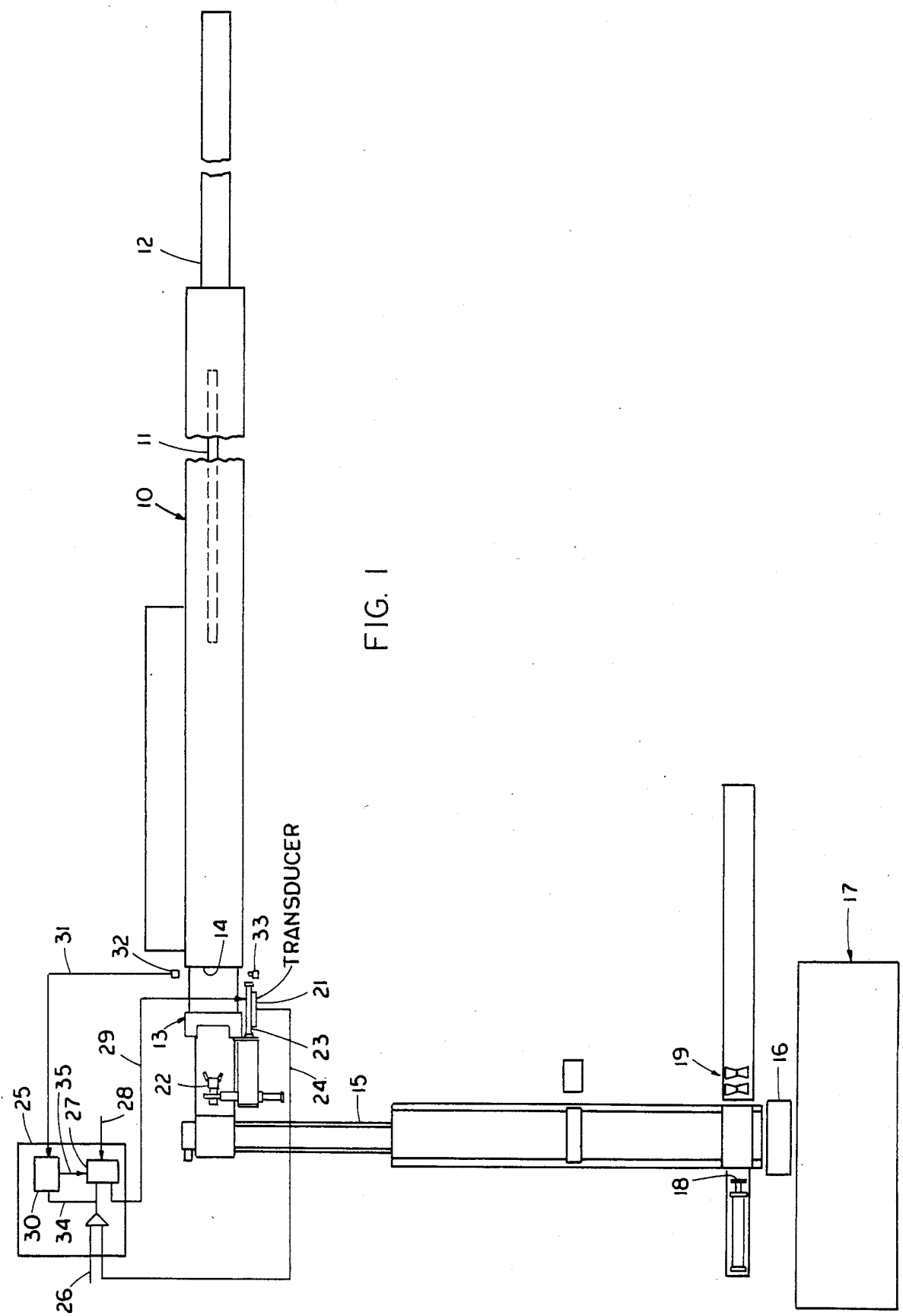
FIG. 1 is a small-scale, diagrammatic plan view of apparatus embodying the features of the present invention for supplying heated billets to an extrusion press.

In FIG. 1, there is illustrated a reheat furnace 10 having an entry end into which a log 11 comprised of suitable material such as aluminum is fed into the furnace and heated while advanced along the length of the furnace by a pusher 12. A shear apparatus 13, as shown in FIGS. 2–5 or FIGS. 10 and 11 is supported closely adjacent the discharge end 14 of furnace 10 so that only a leading end portion of a log emerges from the furnace to thereby prevent undue cooling of an entire log during the shearing operation. It is to be understood that two or more furnaces may be used, if desired, for separately heating logs which can be advanced to separate shear apparatus for producing billets for use in one or more extrusion presses. Through operation of the shear apparatus, as will be described in detail hereinafter, a heated log is severed to form a succession of billets which are delivered by a transfer conveyor 15 to a press charger 16 which forms part of an extrusion press generally indicated by the reference numeral 17. In the event a heated billet cools below a predetermined temperature, a reject ram 18 is operated to push the billet into a reject conveyor 19.

To meet the demand for a supply of billets having accurately predetermined lengths which will vary from time-to-time throughout the operation of an extrusion press due to, for example, wear of the die, the present invention provides a shear apparatus to produce a succession of billets by shearing a heated log into predetermined lengths. Billets used for a typical extrusion operation usually comprise aluminum or aluminum alloy material having a high thermal expansion. A measure of the log length before entry into the furnace cannot be used for accurately controlling the shear and length of billet. A principal object of the present invention is to maximize the use of a log and to minimize the cost for equipment and time to handle waste lengths of prime log material. A log can be initially processed by cutting an unprime short length of log material from the log either before the log enters the furnace or as an initial shearing operation. The prime leading end of a heated log is introduced to a shear for producing a first and succession of billets each having a predetermined desired length. As described in greater detail hereinafter, a shear incorporates a combination of parts to accurately control the length of each billet cut from the log. Notably, these parts include a measuring device 21 (FIG. 1) such as a linear transducer responsive to the position of stop 22 which is controlled by a hydraulic actuator 23. The measuring device 21 produces a signal in line 24 corresponding to the length of travel by the stop 22 from an initial home position, close to the shear knives, to a position outwardly thereof as controlled by the actuator 23. The signal in line 24 is fed to a microprocessor 25 wherein the signal is modified by the addition of a signal in line 26 corresponding to the distance between the stop at its home position and a vertical reference plane called a shear line extending between the movable shear knives.

A summation signal of the signal in lines 24 and 26 is fed to a controller 27 which also receives a signal in line 28 corresponding to a preselected billet length. An output signal from controller 27 is fed by line 29 to the hydraulic actuator 23 for controlling the position of the stop. The microprocessor 25 includes a logic circuit 30 which receives a signal in line 31 from a sensor 32 arranged along the path of travel by a log between the furnace and the shear to detect the trailing end of the log end portion when passed from the furnace while the leading end of the log end portion extends through the shear and contacts the stop 22. An electromagnetic wave emitter 33 such as a light beam is arranged to direct a beam of wave energy transverse to the path of travel by a log so that when the trailing log end passes beyond the beam, a signal is immediately produced in line 31 by detector 32. The logic circuit 30 receives concurrently a signal in line 31 and a signal in line 34, the latter signal being the summation signal of the signals in lines 24 and 26.

The production of a signal in line 24 concurrently with a signal in line 31 energizes the logic circuit 30 to generate a signal which corresponds to the measure of the length of the log end portion which extends through the shear between the stop 22 and the wave energy beam. The signal produced in the logic circuit is processed further for producing a signal in line 35 connected to controller 27 to position and subdivide the trailing end portion of the log into one or more predetermined length pieces which can be combined with another log portion to form a billet having a desired length for an extrusion operation. As explained previously, it is essential to produce an extrusion having a predetermined length and sufficient material remaining in the die holder of the extrusion press to avoid damage to the die.

The present invention enables a variety of shear operating procedures for logs having ends that may or may not be prepared by the removal of unprime material. More particularly, a log can be processed before entry into the reheat furnace by cutting a short length of material from the ends of the log to eliminate unprime material. One frequently utilized procedure for discarding unprime material is to use a metalworking saw to crop both ends of the log. This additional processing operation may be preferred in certain instances but, however, is unnecessary because a log with ends as delivered from a casting apparatus can be processed in the shear of the present invention.

Turning, now, to the shear operating procedure using logs with as-cast ends, a first log is heated in the furnace and the leading end is delivered from the furnace to the shear for cropping. This is accomplished by using the shear to cut a preestablished top crop short length of log material from the leading end. The cropped end is pushed at the discharge side of the shear onto a discharge tray and then the tray is moved to a discard position for disposal of the croped end without entry on conveyor 15. The log is returned to the furnace so that the log can be contacted and controllably pushed to enter the shear. The leading end of the log is then advanced through the shear to cut each of a succession of billets having desired lengths. The length of the trailing end portion of the log is measured through operation of the detector as previously described. When the length of the end portion is less than a minimum usable billet piece plus a preestablished tail crop length, the end piece is rejected. When the length of the end portion is greater than the sum of these two lengths, the log end portion is positioned in the shear so that the shear can be operated to crop the tail length leaving a measured length of prime billet material which is placed in storage. The cropped tail piece is allowed to remain in the lower shear die until it is pushed past the shear line by the leading end of the following log to a distance of its own length plus a pre-established top crop length. The leading end of the following log is now sheared to remove the crop end and both cropped pieces are pushed at the discharge side of the shear onto a discharge tray for disposal without entry on conveyor 15. A short piece of log material is now severed from the next log to form a make-up piece for combination with the prime length of billet material in storage. The microprocessor 25 produces a signal which controls the position of the movable shear stop so that the prime material cut from the leading end of the second log corresponds to the necessary length of a billet piece which can be combined with the length of prime billet material in storage to form a billet comprised of the two billet pieces to form a workpiece having a predetermined usable length for an extrusion operation.

The shear operating procedure using logs having sawed ends is carried out by feeding the leading end of a log from the reheat furnace through the shear and severing a billet having a predetermined length from the log. This procedure is carried out until a log end portion is detected by sensor 32 while concurrently producing a signal corresponding to a measure of the length of the log end portion. When the log end piece is longer than the selected billet length minus the minimum usable piece and up to and including as long as the selected billet length plus the minimum usable piece it will be pushed back into the furnace to become the leading part of the next log. The movable stop is moved into a start position sometime hereinafter referred to as a predetermined position spaced from the shear line, at the delivery side of the shear line. When the leading end of the next log contacts and starts to move the movable stop, the microprocessor 25 delivers a signal to stop the furnace pusher mechanism; close the gripper; and actuate hydraulic actuator 23 to pull the leading part of the log to one-half its length and stop. The log part is sheared in half and the billet piece at the discharge side of the shear is placed in storage. The billet piece at the entry side of the shear is pushed back to the furnace to become the leading part of the next log. The movable stop is moved into a position at the delivery side of the shear line. The next log with a billet piece on its leading end contacts and starts to move the movable stop. At this point in time, the furnace pusher is not signaled to stop nor is the gripper or the puller signaled to function. As the movable stop is pushed to a predetermined position, a signal by microprocessor 25 will be given to actuator 23 to stop the furnace pushing mechanism at the desired billet length. The movable stop is then moved out of the way to allow the two-piece billet to be sheared and discharged. The log is returned to the furnace and the movable stop is moved into a start position at the delivery side of the shear line. As the next log contacts and starts to move the stop, a signal is given by the microprocessor 25 to stop the furnace pusher mechanism; close the gripper; and pull the log to a predetermined distance which is determined by transducer 21 to produce a make-up billet piece to match with the stored billet piece to form a two-piece billet. When a log piece is longer than the selected billet length plus the minimum useable piece, i.e., longer than the distance from the shear line to the sensor 32, no end gap will be detected and the log piece will be pushed back into the furnace to become the leading part of the next log.

Turning, now, specifically to the shear of the present invention, the preferred embodiment of the shear 13 is shown in FIGS. 2-5 and includes a rectangular shear housing 40 having a window opening 41. Bed plate 42 supports the housing to extend in a generally upright position and at the top of the housing, there is a piston and cylinder assembly 43 having a rod end connected to an inner frame 44. Keeper plates 45 retain frame 44 for vertical movement in the window of the housing. A lower clamp block 46 is supported by a block 47 which is, in turn, supported for reciprocating movement along a vertical slot 48 formed in the lower part of the inner frame 44. Also situated in the slot 48 is a rod end of a piston and cylinder assembly 49 that is supported by the lower end of the inner frame for moving the lower clamp half against the lower surface of a log at the discharge side of the shear.

As best shown in FIG. 3, the upper shear die 51 is supported by the upper part of the inner frame 44. Above the upper die there is an opening 52 in the inner frame through which a ram 53 can pass by operation of a piston and cylinder assembly 54. The assembly 54 is supported in a cantilever fashion by a flange plate 56 which is attached to the inner frame 44 above opening 52. A combination billet puller and measuring apparatus 57 includes a cantilever frame 58 forming, as shown in FIGS. 4 and 5, a lateral attachment to the housing 40. A flange plate 59 supports the actuator 23 comprising a piston and cylinder assembly with the cylinder portion thereof arranged to conveniently extend toward the furnace and the piston rod portion connected to a slide block 62. The measuring device 21 (FIG. 1) such as a linear transducer is incorporated in assembly 23 to provide an electrical signal corresponding to displacement of the piston relative to the cylinder. Extending between flange plate 59 and a frame end plate 63 are spaced-apart slide rods 64 which extend through suitable openings in the block 62 for guiding and support thereof. In a section of the block 62 extending below rods 64 there is a slide bar 65 extending in a bore which is transverse to the extended length of the rods 64. One end of the slide bar is connected to the rod end of a piston and cylinder assembly 66 which can be actuated to move a gripper head 67 between a stored position by retracting it toward the block 62 and a log-engaging position in the path of travel of a log. The gripper head 67 which forms stop 22 (FIG. 1) includes a housing 68 having a central bore to slideably support an actuator shaft 69. Gripper arms 71 take the form of levers connected by pivots 72 to the housing 68. An end of the arms 71 engages in pockets formed at diametrically-opposite sides in the shaft 69. A piston and cylinder assembly 73 is connected to move the shaft 69 back and forth in the housing 68 and thereby pivot the gripper arms into and out of engagement with an end of a log when located between the arms. By operation of the piston and cylinder assembly 23, the gripper head can be moved into a gap below the upper shear die 51 to a predetermined position that is spaced from a shear line 75. The shear line extends vertically at the end faces of the upper shear die 51 and a lower shear die 76 which are on opposite sides of the shear line. Shear die 76 is supported by a holder 77 in the bottom of window 41 by housing 40. An upper clamp block 78 is carried by a movable block 79 in window 41 by a piston and cylinder assembly 81 which is, in turn, supported by the shear housing 40 at the top of the window therein. As shown in FIG. 3, the holder 77 includes an opening situated below shear die 76 and provides a compartment for a ram block 83 connected to the rod end of a piston and cylinder assembly 84 which is supported by block 77.

The position of the shear parts shown in FIGS. 2 and 3 is such that the movable upper shear die 51 is elevated to an up position and the upper clamp block 78 is elevated to an up position by operation of piston and cylinder assembly 81. The lower clamp block 46 is lowered by operation of the piston and cylinder assembly 49.

The dies 51 and 76 as well as clamp blocks 46 and 78 have log-engaging surfaces which correspond to the profile of a log. When a log has an annular cross-sectional shape, the log-engaging surfaces of the dies and blocks are semicircular. At the delivery side of the shear there is a vertically-adjustable billet tray for receiving a billet at the conclusion of a shearing operation which is ejected from the shear. At the entry side of the shear there is a resiliently mounted guide to facilitate advancing movement of a leading end portion of a log when pushed from the furnace into the shear.

A log is pushed or driven out of the furnace until it contacts the front end of actuator shaft 69 of the log puller. Initially, the piston and cylinder assembly 73 is operated to hold the gripper arms out of engagement with the log. The measuring device 21 senses movement of the slide block and the distance moved. When the log contacts and moves the log puller, the measuring device will sense the movement and a signal is produced by the microprocessor 25 to actuate piston and cylinder assembly 73 of the log puller to move the gripper arms into clamped engagement with the log. At the same time, the actuator 23 is pressurized, thus pulling the log out of the furnace until a predetermined billet length passes the shear line 75 which is controlled by the measuring device 21 and the microprocessor 25. As the log is pulled out of the furnace, the furnace pusher can be stopped or the log puller can be operated at a speed in excess of the transport speed of the next log in the furnace so as to create a gap between the log fed into the shear and the next log in the furnace. The electromagnetic beam produced by wave emitter 33 is directed toward detector 32 at a preestablished distance from the shear line 75. This distance is the fixed distance input by line 26 to microprocessor 25 and can be a desired billet length plus a minimum usable length from the shear line. An accurate measurement of the log length corresponds to the measurement signal by the transducer 21 plus the signal in line 26. If a short piece might be produced, i.e., a minimum useable piece up to and including as long as the selected billet length minus the minimum useable piece, a two-piece billet can be made by pushing that piece back to the furnace to become the leading part of the next log. A log piece less than a minimum useable piece is avoided when the measuring device recognizes a log remaining of a length less than a billet length plus a minimum useable piece and will subsequently shear the log remaining into two equal billet pieces on the next shearing cycle. The billet piece on the discharge side of the shear is placed in storage and the billet piece on the entry side of the shear will be pushed back to the furnace to become the front end of the next log to form a two-piece billet on the next shear cycle. Immediately after shearing a two-piece billet, a make-up billet piece will be sheared to form with the stored billet piece a two-piece billet. The log puller of the present invention can also be used to pull billets, one at a time, through the shear after heating in the furnace to an extrusion temperature. The mode of operation occurs when, for example, it is desired to form individual billets by subdividing a log before entrance of the log into the furnace.

Figure 6:
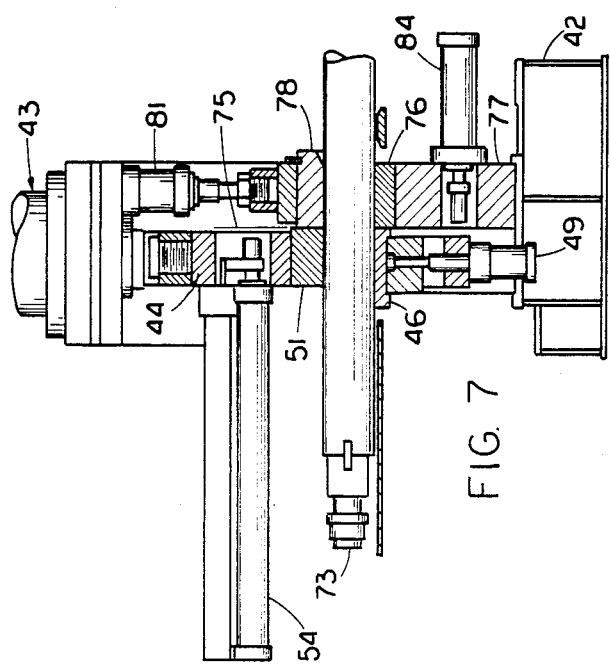
FIGS. 6–9 illustrate the sequence of operation of the preferred embodiment of the billet shear according to the present invention.
Figure 7:
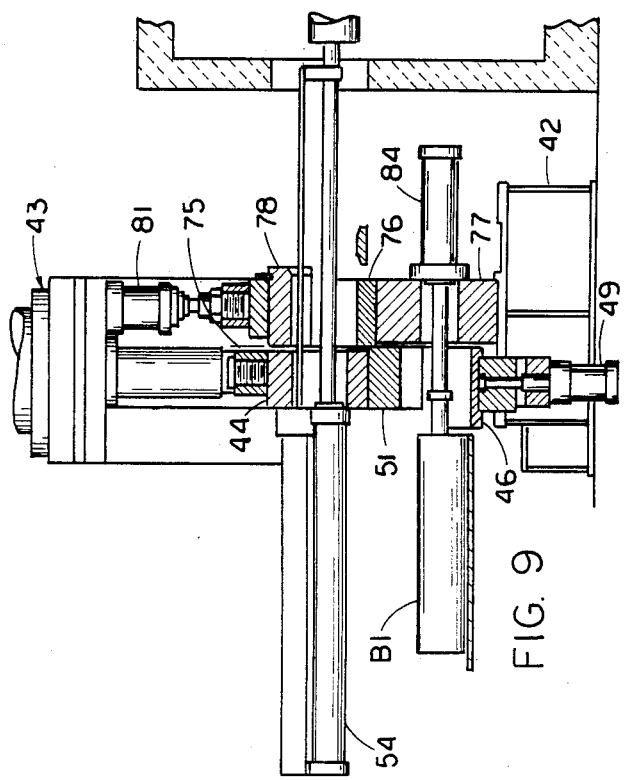
Figure 8:
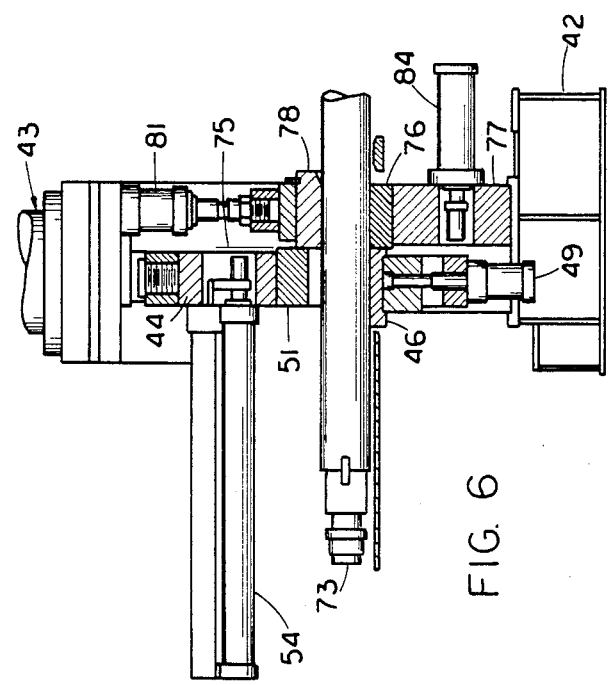

As the leading end of a log emerges from the reheat furnace, by operation of a log pusher or other advancing means, the log moves through the opening between the upper clamp block 78 and lower shear die 76, thence through the opening between the upper shear die 51 and the lower clamp block 46. Gripper head 67 is positioned by operation of actuator 23 through operation of microprocessor 25 at a desired spaced location from the shear line. A shearing operation is performed to crop the leading end of the log, when the leading end was not previously processed, to remove an unprime end portion. The log is then cut through operation of the shear by initially moving the upper clamp block 78 downwardly into contact with the log through operation of piston and cylinder assembly 81. At the same time, the guide being resiliently supported is forced downwardly by reason of contact with the log. This position of parts is illustrated in FIG. 6. Thereafter, as illustrated in FIG. 7, piston and cylinder assembly 43 is actuated to move the upper shear die 51 downwardly into contact with the log; thus initiating the actual severing of a log. As illustrated in FIG. 8, continued operation of piston and cylinder assembly 43 forces the inner frame 44 downwardly, thereby forcing the upper shear die downwardly while the lower shear die 76 remains stationary. As the piston and cylinder assembly 43 is moved to the end of its stroke, a sheared billet B1 is produced. Concurrently, by the construction and arrangement of parts of the shear, ram 53 is displaced into an aligned relation with the leading end face of the remaining log portion and ram block 83 is aligned in a confronting relation with the newly-sheared end face of billet B1.

Figure 9:
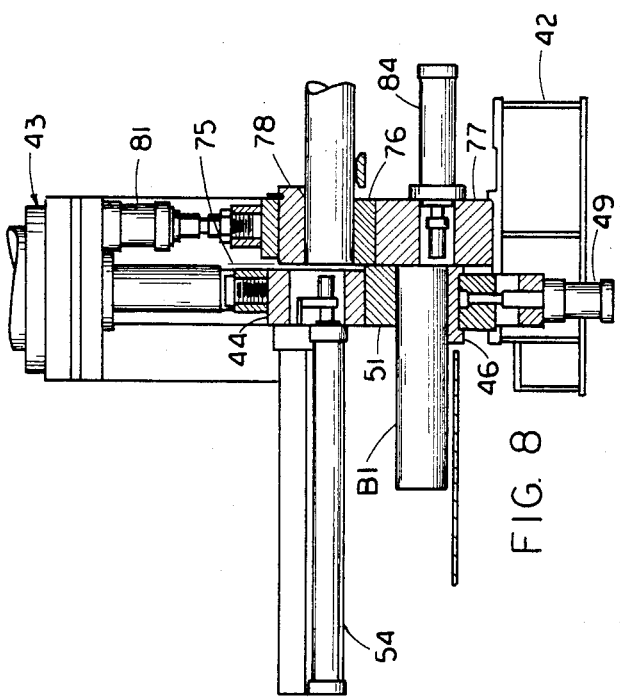

As shown in FIG. 9, piston and cylinder assembly 81 is actuated to life the upper clamp block 78 from the log and piston and cylinder assembly 49 is actuated to lower the lower clamp block and the portion of billet B1 supported thereby from engagement with the upper shear die 51. The shearing cycle is completed by, as shown in FIG. 9, operating piston and cylinder assembly 54 to return the leading end of the log from the shear to the furnace. The desired elevated temperature of the billet can be maintained in this way which also assures consistent thermal expansion characteristics for accurate measurements of billets subsequently cut from the log. Piston and cylinder assembly 84 is operated to eject the sheared end portion of the billet from the lower clam half onto the receiving tray for transferring the billet to the extrusion press as previously described. The piston and cylinder assemblies 54 and 84 are then actuated to retract the rams coupled thereto whereupon piston and cylinder assembly 43 is actuated to lift the inner frame and parts connected thereto which include the upper die 51 to the position shown in FIG. 6.

Turning, now, specifically to the embodiment of the shear of the present invention shown in FIGS. 10 and 11, the same reference numerals have been used to identify the parts which are the same as set forth hereinbefore. An H-frame 90 is attached at one end to the inner frame 44 by flange plates 91. The H-frame 90 has an H-shaped cross-sectional configuration as illustrated in FIG. 10 formed by spaced-apart vertical side plates 92 that are connected together by a horizontal web plate 93. The piston and cylinder assembly 54 is situated in a compartment formed by an area between plates 92 and above web plate 93. The area below web plate 93 and between plates 92 forms a compartment wherein a billet-measuring apparatus 94 is situated. Apparatus 94 includes a piston and cylinder assembly 95 having built therein a linear measurement transducer which produces a signal corresponding to movement of a piston rod 96. Rod 96 is connected to yoke 97. Spaced-apart guide rods 98 extend along opposite sides of the piston and cylinder assembly 95 from the yoke 97 to a measuring head 99. The measuring head has a generally U-shaped configuration as best shown in FIG. 10 to provide upwardly-extending legs that can slide back and forth along the lower inner surfaces of plates 92 in the space beneath plate 93. Beneath these legs is a section having a face surface 101 (FIG. 11) that is directed toward an opening formed by the upper shear die 51 and a lower clamp block 46. A recess extends from face 101 in the measuring head to form a pocket wherein a cropped end measuring block 102 is contained. Block 102 is connected to the rod end of a piston and cylinder assembly 103 which is supported by the measuring head so that upon operation of the piston and cylinder assembly 103, the cropped end measuring block 102 is extended outwardly from the face 101 into a gap between the shear dies to a predetermined position that is spaced from shear line 75. At the delivery side of the shear there is a billet tray 104 supported by an actuator 105 for receiving a billet at the conclusion of a shearing operation which is ejected from the shear. At the entry side of the shear there is an ejector guide 106 carried by a resilient support 107, e.g., springs, for vertical movement to facilitate advancing movement of a leading end portion of a log when pushed from the furnace into the shear.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. A method for shearing logs to form billets for an extrusion press, the method including the steps of
    passing a first log from a reheat furnace into a shear for shearing a succession of billets having desired lengths,
    measuring the length of a first end log section by creating a gap between the trailing end thereof and the leading end of a second log having a trailing end portion in the reheat furnace,
    simultaneously sensing the position of the leading end of the first end log section, and
    positioning the leading end of the first end log section according to the measured lengths thereof for shearing a precise billet length for said extrusion press.

2. A method for shearing logs to form billets for an extrusion press, said method including the steps of:
    passing a first log from a reheat furnace into a shear and shearing the log to form a succession of billets having desired lengths, and to form a log end portion of said first log,
    feeding a leading end of said log end portion through the shear,
    producing a first signal corresponding to the magnitude of the length of the first log end portion passed through the shear by detector displacement of a detector along the path of travel by the leading end of the log end part through the shear,
    producing a second signal by detecting the trailing end of said first log end portion at the discharge side of the reheat furnace,
    generating a third signal corresponding to a measure of the length of the log end portion by the concurrent production of said first and second signals, and
    using said third signal to determine a desired sheared length from the log end portion to produce a billet for extrusion is an extrusion press.

3. The method according to claim 2 wherein said step of detecting includes directing an electromagnetic beam across the trailing end face of the log end portion to impinge on the detector.

4. The method according to claim 3 wherein said electromagnetic beam is a light beam.

5. The method according to claim 2 wherein said step of using said third signal includes determining the lengths of two billet parts for shearing from said log end portion, and wherein said method includes the further step of shearing a second of said logs to form two billet make-up lengths each having a desired length for combining with one of said two billet parts to form a composite billet having a desired length for use in said extrusion press.

6. The method according to claim 5 including the further steps of storing one of said two billet parts in a furnace, and retaining a second of said two billet parts at a billet-discharge side of said shear for combination with one of said two billet make-up lengths.

7. The method according to claim 6 including the further steps of causing the leading end of said second log after passage through said shear to move said length detector for producing said first signal, and using said first signal to position a length of said second log passed through the shear to form one of said two billet make-up lengths.

8. The method according to claim 2 wherein said step of passing includes causing the leading end of said first log after passage through said shear to move said length detector for producing said first signal, and using said first signal to position a length of said first log passed through the shear for producing a billet having a desired length.

9. The method according to claim 2 including the further step of using said third signal for cropping the trailing end of said log end portion.

* * * * *